United States Patent
Dulaney et al.

(10) Patent No.: US 6,469,275 B2
(45) Date of Patent: *Oct. 22, 2002

(54) OBLIQUE ANGLE LASER SHOCK PROCESSING

(75) Inventors: Jeff L. Dulaney, Dublin, OH (US); Allan H. Clauer, Worthington, OH (US); Steven M. Toller, Grove City, OH (US)

(73) Assignee: LSP Technologies, Inc, Dublin, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,419

(22) Filed: May 18, 2001

(65) Prior Publication Data

US 2002/0000428 A1 Jan. 3, 2002

Related U.S. Application Data

(63) Continuation-in-part of application No. 09/234,381, filed on Jan. 20, 1999, now Pat. No. 6,236,016.

(51) Int. Cl.[7] .............................................. B23K 26/00
(52) U.S. Cl. .................................................. 219/121.85
(58) Field of Search ....................... 219/121.68, 121.69, 219/121.85; 148/525, 565

(56) References Cited

U.S. PATENT DOCUMENTS

| 4,115,683 A | 9/1978 | Clark et al. |
| 4,304,978 A | 12/1981 | Saunders |
| 4,336,439 A | 6/1982 | Sansnett et al. |
| 4,414,038 A | 11/1983 | Dausinger et al. |
| 4,547,651 A | 10/1985 | Maruyama |
| 5,525,429 A | 6/1996 | Mannava et al. |
| 5,756,965 A * | 5/1998 | Mannava ................ 219/121.85 |
| 5,911,890 A * | 6/1999 | Dulaney et al. ....... 219/121.85 |
| 6,183,882 B1 * | 2/2001 | Mannava et al. ........... 148/565 |
| 6,236,016 B1 * | 5/2001 | Dulaney et al. ............ 148/525 |

FOREIGN PATENT DOCUMENTS

| EP | 0 666 326 A1 | 12/1994 | |
| EP | 1 088 903 A1 | 9/2000 | ........... C21D/10/00 |

* cited by examiner

Primary Examiner—Geoffrey S. Evans
(74) Attorney, Agent, or Firm—Randall J. Knuth

(57) ABSTRACT

A method and apparatus for improving properties of a solid material by providing shockwaves therethrough. The method includes controlling the incident angle $\Theta$ of the laser beam applied to the workpiece so that the required residual stresses are created in the workpiece. Particular methods of control such as lenses, polarizers, and particular transparent overlay geometries are shown. The apparatus includes structure for controlling the position and incident angle of the laser beam then controlling the polarization and/or the shape of the incident impact area, based on such incident angle $\Theta$ or thickness of the workpiece.

6 Claims, 6 Drawing Sheets

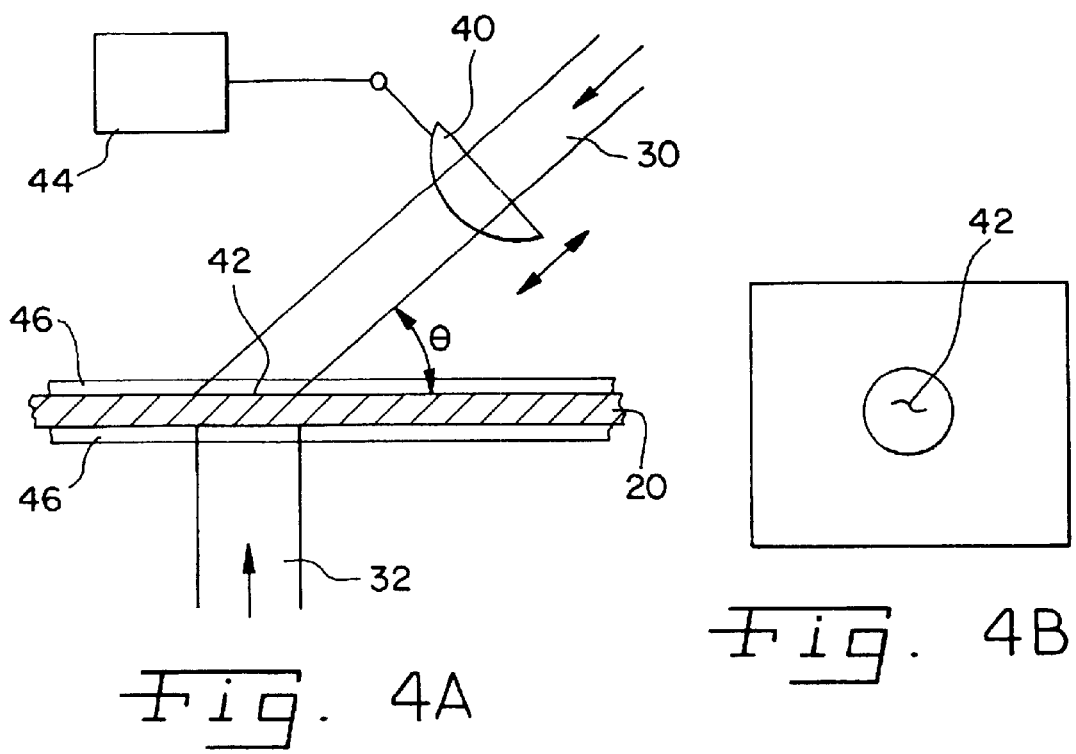
Fig. 4A
Fig. 4B
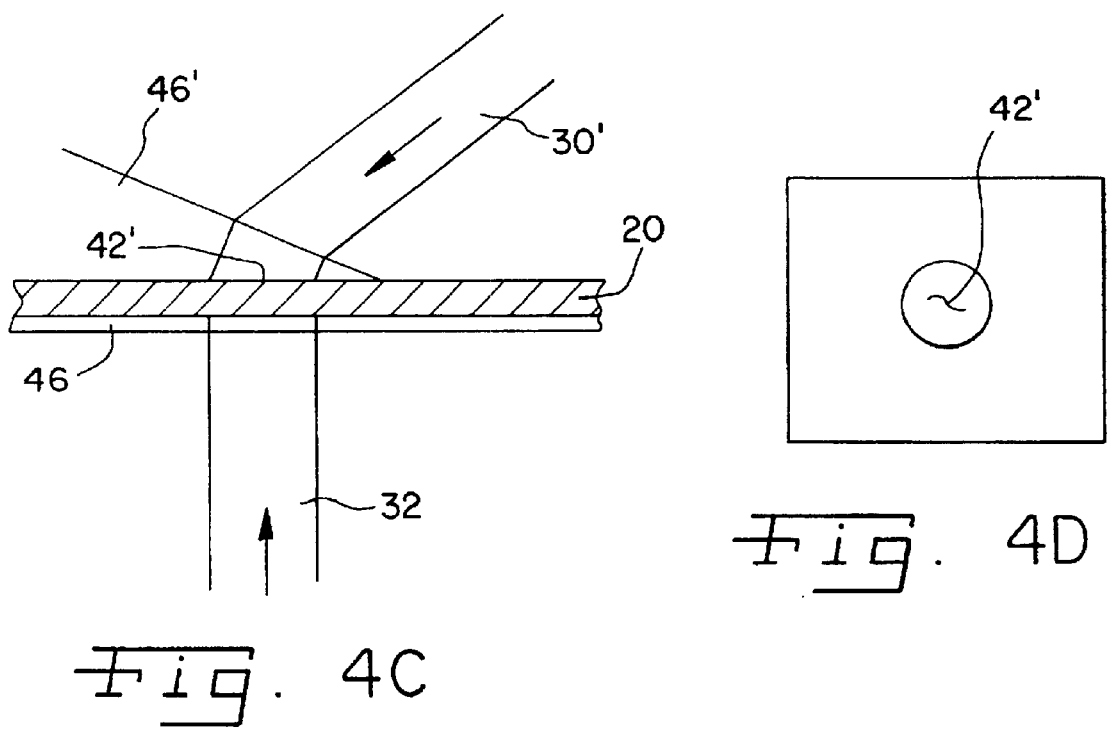
Fig. 4C
Fig. 4D

OBLIQUE ANGLE LASER SHOCK PROCESSING

This is a continuation-in-part of patent application Ser. No. 09/234,381, filed on Jan. 20, 1999, now U.S. Pat. No. 6,236,016, the disclosure of which is herein explicitly incorporated by reference.

BACKGROUND OF THE INVENTION

1. Field of the Invention

The present invention relates to the use of coherent energy pulses, as from high power pulsed lasers, in the shock processing of solid materials, and, more particularly, to methods and apparatus for improving properties of solid materials by providing shock waves therein where the laser beam impacts the solid material at an oblique angle. The invention is especially useful for enhancing or creating desired physical properties such as hardness, strength, and fatigue strength.

2. Description of the Related Art

Known methods for the shock processing of solid materials, particularly, known methods for the laser shock processing of solid materials, typically used coherent energy from a laser beam oriented normal to a workpiece. This normal orientation, if shape of the laser beam is symmetrical, makes a symmetrical impact area on the workpiece.

In FIG. 1, laser shock processing is shown with the laser beam 10, having a particular diameter D, passing through a transparent overlay layer 12 to impact workpiece 14. The impact area of workpiece 14 is shown as the area of a spot having a diameter S1, shown in FIGS. 1A and 1B.

Particular constraints of laser shock processing are sometimes created based on the shape of the material or other geometric factors such as when attempting to work integrally bladed rotors (IBR's), blind bores, slots, or dovetail sections. In these cases, the laser beam 10, from necessity, needs to impact workpiece 14 at a particular angle Θ. This causes the dimensions of the impact spot to change in one or more directions. As shown in FIGS. 2a and 2b, the shape of the spot changes to an ellipse with a major diameter S2, even though the nominal beam diameter D of laser beam 10 has not varied.

The consequences of such a change of the incident spot shape necessarily changes the energy density applied to the workpiece 14, all other factors being constant. This particular change of the applied pressure, i.e., the energy density per unit area compared to other areas on the same surface creates a possibility of non-uniformly working the material, thereby possibly losing some of the benefits of laser shock peening.

Typical laser shock processing techniques and equipment can be found in U.S. Pat. No. 5,131,957 to Epstein, along with that of U.S. Pat. No. 5,741,559 entitled LASER PEENING PROCESS AND APPARATUS, assigned to the assignee of the present invention and hereby incorporated by reference.

This non-uniformity of energy application to a workpiece may cause severe problems, particularly when hitting a workpiece from opposite sides at the same time, as used with a split beam laser system. Such opposing hits are sometimes needed on workpieces of thin cross-section, such as disks, blades, and other workpieces of different geometries. In conventional split beam processing, there is a possible effect of not having the laser processed portions on the opposite sides of the workpiece worked identically, and at the same time when elliptical spots are utilized. Such non-uniform working of the workpiece may cause over or under working of the material, or distortion of the work pieces, thereby not achieving the goals of laser shock processing.

Furthermore, based upon the oblique angle Θ, along with the particular transparent overlay material utilized, polarization issues regarding the reflection of the laser beam from the surface of the transparent overlay layer can possibly degrade and reduce the energy applied to the workpiece.

What is needed in the art is a way to modify the incident spot of laser applied energy to consistently make and have a uniform working of the workpiece at such location.

SUMMARY OF THE INVENTION

The present invention provides a method of laser shock processing that can be used in a production environment to significantly reduce the non-uniformity of the applied energy to a workpiece by modifying the shape and location of the applied laser energy pulse.

In one form of the invention, the method calls for applying the transparent overlay material to the workpiece and directing a pulse of coherent energy through the transparent overlay to contact the solid material at an oblique angle to create a shockwave. Such oblique angle may be greater than 10 degrees, even to between 60 to 80 degrees from a normal axis into the workpiece through the point of contact. Additionally, the laser processing method may comprise a step of passing the pulse of energy through a lens to reform the shape of the incident area on the workpiece, to counteract geometric effects created by the workpiece surface orientation on the incident area shape. In one form of the invention, the lens may be a cylindrical lens. Alternatively, other forms of lenses may be used, depending on the geometry of the workpiece, laser beam, and processing conditions utilized.

In another form of the invention, the transparent layer may be of non-uniform thickness, thereby acting as the lens.

In yet another form of the invention, the laser processing method could be used to process substantially opposite sides of the workpiece. Such method includes the steps of applying a laser beam substantially normal to the workpiece; applying a laser beam substantially oblique to the workpiece on a substantially opposite side thereof; and controlling the laser beam so the workpiece experiences substantially identical conditions on substantially opposite sides of the workpiece. This independent orientation of the pressure pulses and worked areas on the workpiece allows controlled interaction of the indepth worked areas on the workpiece. The method further includes processing methods, which counteract the geometric effects of such oblique angle to maintain the energy per unit area applied to the workpiece, and preferably make the energy applied to opposite sides of the workpiece substantially equal.

Another embodiment of the present invention, includes the steps of applying a transparent overlay material to the workpiece and directing a pulse of coherent energy to contact the solid material throughout the transparent overlay material to create a shockwave. Controlling the shape of a contacting pulse is based on the incident angle of the pulse to the workpiece. The method may further include a means for changing the polarization of the laser beam pulse based on the incident angle to the workpiece.

In another form of the invention, two laser beams are utilized to process substantially opposite portions of a workpiece. The laser beams are offset, (not co-linear) from one another to form pressure pulses on opposite sides of the workpiece that are substantially congruent and overlap each other as they pass through the workpiece.

The invention also includes an apparatus for improving the properties of the workpiece including the transparent overlay applicator for applying a transparent overlay to the workpiece, and having a laser associated with the transparent overlay applicator to provide an oblique laser beam through the liquid transparent overlay to create a shockwave on the workpiece. A positioning mechanism is attached to selectively position the workpiece relative to the laser beam, while a control unit is operatively associated to the laser beam and positioning mechanism to control the operation timing of the laser and selective operation of positioning mechanism. A means is included for changing the polarization of the laser beam supplied from the laser as a function of the relative position of the laser beam and workpiece.

Another embodiment of the present invention, includes an apparatus having a transparent overlay applicator for applying the transparent overlay to a workpiece, laser operationally associated with the transparent overlay applicator to provide an oblique laser beam through the transparent overlay to create a shockwave on the workpiece. A means for changing the shape of the provided laser beam, depending upon the relative angle between the laser beam and the workpiece surface, is provided, along with a control unit, operatively associated with the laser, to control the operation and timing of the laser and means.

An advantage of the present invention is that by modifying the spot shape by controlling the laser and laser beam shape, and/ controlling laser beam polarization to modify reflection, it is possible to control the shock pressure applied to the workpiece in a production environment.

Another advantage of the present invention is that it is now possible to process workpieces with a combination of normal laser beams and oblique laser beams from the same or different lasers. Further, the present invention processes such workpieces efficiently and uniformly.

Yet another advantage of the present invention is that the method provides for shaping the incident spot of contact, i.e., where the energy from the laser beam is incident upon the workpiece, to make a desired shape or energy concentration, depending upon the needs or features of the workpiece to be worked.

A further advantage of the present invention is that one can control the polarization of the laser beam relative to the incident angle of the laser beam to the workpiece. This control of polarization increases the efficiency of using the energy supplied from the laser beam, to cause more (or less) energy to couple with and work the workpiece.

Another advantage of the present invention is the fact that relatively thin workpieces such as airfoils may be processed with split beam processing with offset laser beams to create congruent pressure pulsed areas through the workpiece.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4A is a diagrammatic field of one embodiment of the present invention showing compensation for the elongation of the incident area on one of the laser beams impacting the workpiece;

FIG. 4B is a plan view of incident area of FIG. 4A of the oblique laser beam showing the substantially same spot sizes on the substantially opposite side of the workpieces;

FIG. 4C shows another embodiment of the invention where a transparent overlay layer of non-uniform thickness is used to control the incident area shape by a refraction effect;

FIG. 4D is a plan view of the incident area of the invention shown in FIG. 4C;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The improvements in fatigue life produced by laser shock processing are the results of residual compressive stresses developed in the irradiated surface that retard fatigue crack initiation and/or slowing of crack propagation. Changes in the shape of a crack front and slowing of the crack growth rate when the crack front encounters the laser shocked zone have been shown. Laser shock processing is an effective method of increasing fatigue life in metals by treating fatigue critical regions. For a more thorough background and the prior history of laser shock processing and high powered processing of engineered materials, reference can be made to U.S. Pat. No. 5,131,957. This patent shows the type of laser and laser circuit adaptable for use with the present invention. Another type of laser adaptable for use with the invention, is that with a ND-Glass Laser manufactured by LSP Technologies, of Dublin, Ohio. Discussion of transparent overlays, utilized in the present invention, are not discussed here in detail. Transparent overlay material used is normally substantially transparent to the laser radiation. Useful transparent overlay materials include water, water based solutions, glass, quartz, polymers, and many other types of materials. Additionally, the transparent overlay could be a gel or strip of tape comprised of one of many other materials.

The present invention includes the laser shock process and efficiency and process uniformity increases in particular materials utilized, by changing the geometry of the laser impacted spot and giving the operator of such a process more control over the particular application of pressure and work accomplished on the workpiece. A particular discovery of the present inventors is that the particular angle is not critical as applied to the workpiece, i.e., the angle between the laser beam path and the surface of the workpiece, which is identified at Θ, since it is only the actual energy density, i.e., energy per unit of area, that matters in terms of actually working the area of a workpiece. The shock waves, in all cases, are formed and projected in to the material substantially normal to the surface of the workpiece.

The inventors have identified that as long as sufficient energy density is applied to the workpiece to create the formation of the required residual stresses within the workpiece, almost any angle may be effectively accomplished.

Figure 1A:
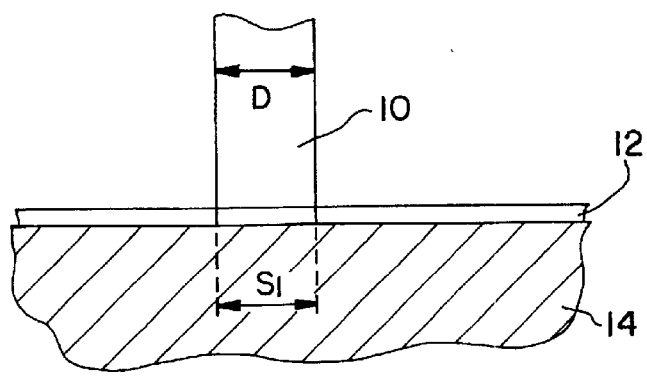
FIG. 1A is a sectional view of a laser processing operation with the laser beam substantially normal to the surface of the workpiece.
Figure 1B:
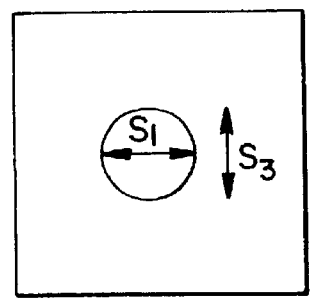
FIG. 1B is a plan view of the incident area of FIG. 1A of the laser beam on the workpiece.
Figure 2A:
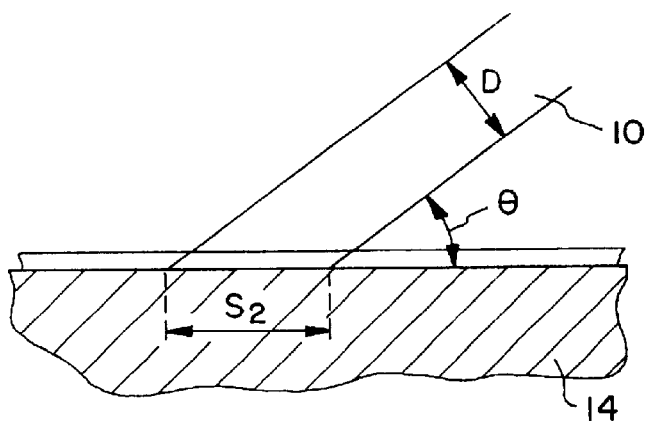
FIG. 2A is a sectional view of a workpiece during a laser processing operation where the laser beam is at an oblique angle $\Theta$ to the workpiece.
Figure 2B:
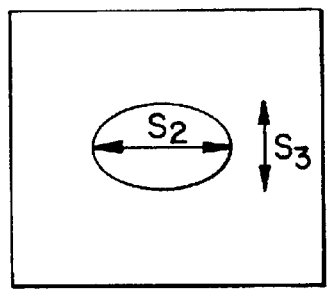
FIG. 2B is a plan view of the incident area of FIG. 2A showing the elongation of a spot diameter S2.

As shown in FIG. 1 as compared to FIG. 2, an increase in the size of the incident spot S is due to the decrease of incident angle Θ of the laser beam 10. If all other conditions are maintained constant, the energy per unit area applied to workpiece 14 would be reduced. The present method and apparatus permits laser shock processing at oblique angles, while maintaining substantially constant energy density in a production environment, which such action could never be accomplished before. Additionally, the present invention permits a change to the incident spot shape, such that limitations of the application of laser shock processing imposed by the geometry and orientation of the workpiece is reduced.

Figure 3:
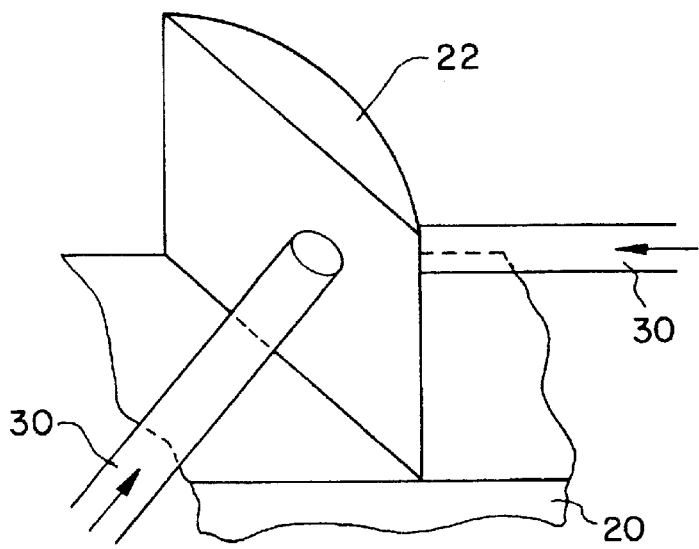
FIG. 3 is a fragmentary, diagrammatic view of an integrally bladed rotor being worked by the method of the present invention on substantially opposite sides of the blades thereof.

A particular type of workpiece 20 is shown in FIG. 3, is that of an integrated blade and disk, commonly referred to as an integrally bladed rotor or IBR. Such pieces have convoluted thin shaped members 22 (blades) that are normally densely packed around the circumference of a disk. Such densely packed thin blades of one such IBR may be seen FIG. 6. The present invention permits utilization of a split beam laser system, or system utilizing two separate laser sources to impact either normally, obliquely, or both, to substantially opposite portions of the workpiece 20, such as an integrally bladed rotor. The method provides for ensuring that the worked areas, i.e., the impact areas of each individual laser beam 30 impact substantially opposite sides of the workpiece such that residual compressive forces are substantially matched therebetween. It is believed that this matching of the compressive worked areas is what increases the efficiency and effectiveness of the laser shock peening process and avoids negative effects such as distortion and non-uniformity of processing.

The laser shock peening process as shown in an embodiment of FIG. 4A, shows an incoming laser beam 30, oblique to a workpiece 20 at an angle Θ, having a similar laser beam 32 shown impacting a substantially opposite and equal area on an opposite side of workpiece 20. Laser beam 32 impacts workpiece 20, essentially normal to its respective surface. A means for correcting the incident area created by laser beam 30, is shown in FIG. 4A as, in one form, a lens 40. In the embodiment shown in FIG. 4A, lens 40 may be that of a cylindrical-type lens to change the dimension of the incident spot in one axis. Such incident spot shown in FIG. 4B as 42, has the same size spot as that being created via laser beam 32. A control mechanism 44 is utilized to vary the effective refraction and/or location of the shape changing means 40 to ensure that the impact spot 42 is shaped substantially similar to the opposite one created by laser beam 32. Control unit 44 may use as an input the relative incident angle Θ to create a particular intended spot shape, in this case, a circular spot on both sides of workpiece 20. Movement of lens 40, along with its particular diffraction power, may be selected or moved by robotic, hydraulic, or pneumatic means, preferably done automatically. Control unit 44 may be a personal computer programmed to control lens 40. In this way, the shape and size of spot 42 may be corrected automatically, and is therefor adaptable for production use. Also shown in 4A, is a transparent overlay layer 46, utilized, as previously known in the art, such that the thickness of the transparent overlay is substantially uniform over the incident area spot 42, on each side of workpiece 20.

FIG. 4C shows an alternate means and method for controlling the impact area and its shape, as by means of changing the thickness and shape of the transparent overlay layer 46'. FIG. 4C shows the non-uniform transparent overlay layer 46' may be utilized to change the effective impact area shape 42'. With particular use of solid or semi-solid transparent overlay applications, it is possible to change the effective incident spot 42' to a required or desired shape. The importance for being able to effectively change the incident spot 42 or 42' permits the laser shock processing method to create essentially and substantially matched shock waves on substantially opposite sides of the workpiece.

Figure 5:
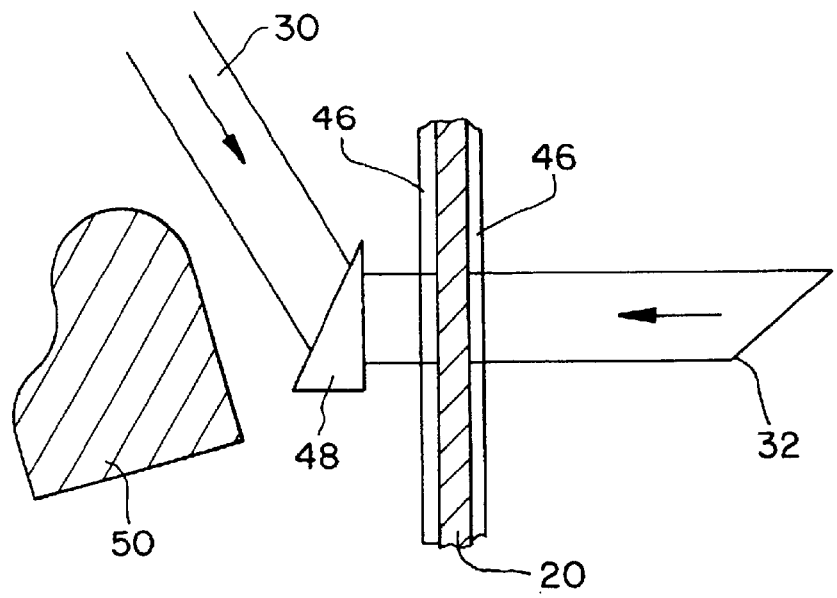
FIG. 5 is another embodiment of the present invention using a trapezoidal lens to alter the oblique angle and incident spot shape due to a necessity to change the direction of the laser beam because of an additional portion of the workpiece.
Figure 6:
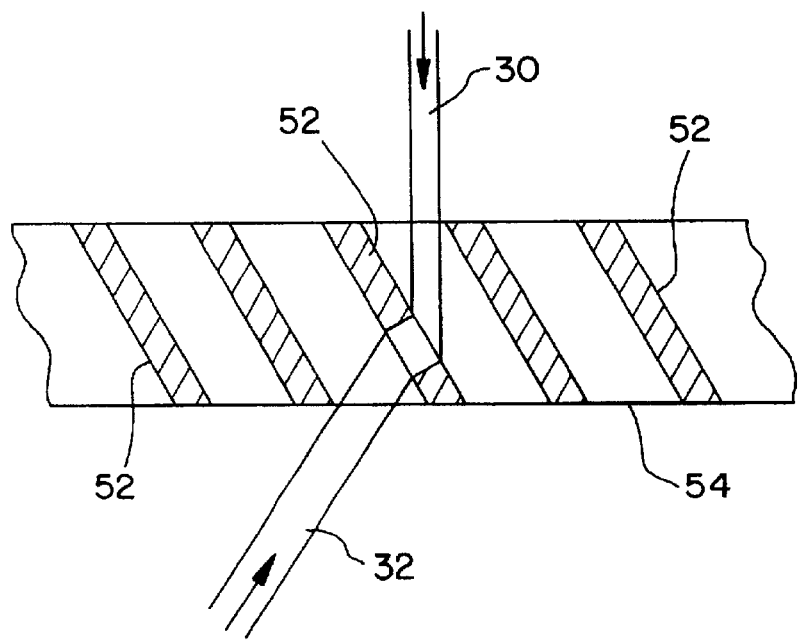
FIG. 6 is a diagrammatic view of use of one form of the laser processing method of the present invention on opposite sides of a blade portion of an integrated blade and disk member.

FIG. 5 shows another embodiment of the invention, in which an oblique laser beam 30, approaching workpiece 20 from the left side, passes through a trapezoidal layer or prism, such as a polymer lens or glass lens, to change the particular aspect ratio of oblique incident laser beam 30. Use of such trapezoidal type lens again permits matched worked areas on opposite sides of workpiece 20. As shown in FIG. 5, an object 50 is shown. On some workpieces laser shock processing may be unable to access an area by a normal oriented, laser beam. Furthermore, it may be the case at times where it is necessary to have both laser beams impact the workpiece 20 at an oblique angle. FIG. 6 shows such a workpiece geometry such as the system operating upon a blade section 52 of an IBR 54. In the prior art, as known by inventors, it was not possible to simultaneously operate from opposite sides of the entire blade portions 52 of such IBR 54 with precision. Additionally, many other types of workpieces have convoluted geometries that may be equivalently laser shock processed.

Figure 7:
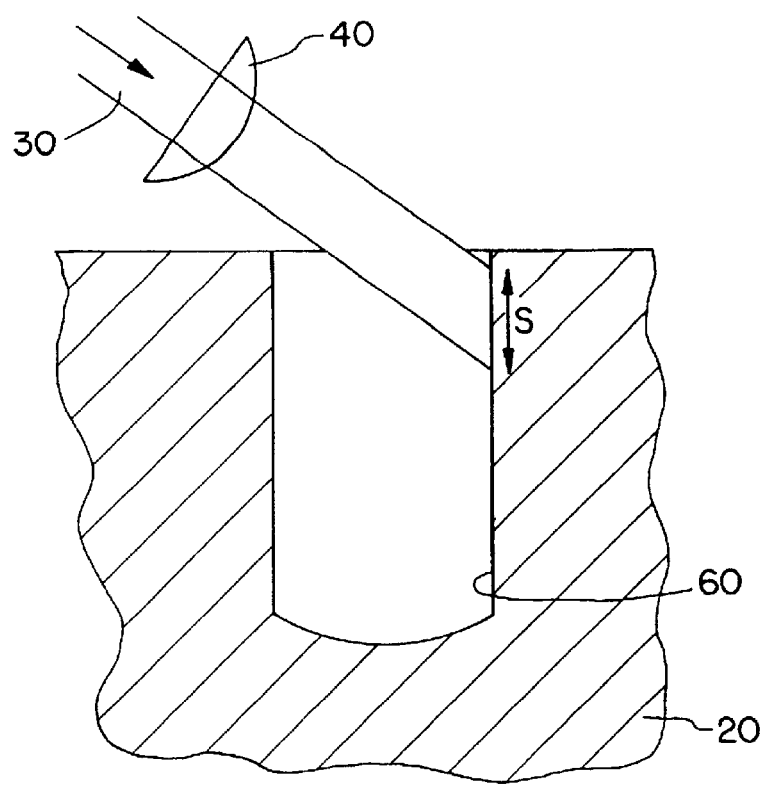
FIG. 7 shows utilization of the present invention on a recess within a workpiece.

FIG. 7 shows another example of utilization of the present invention, in which another lens 40 is utilized, i.e., a cylindrical lens, although other shapes may be utilized. Lens 40 is used to change the spot dimension S as laser beam 30 impacts within a recess 60 within workpiece 20. The shape of such recess 60 may be that of a blind bore, hole, slot, ridge, or other type of regular or irregular shaped recesses, in which it is desired to have laser shock processed areas therein. The oblique area processing of the present invention permits such uniform worked areas within the recess, regardless of the particular geometry.

Figure 8:
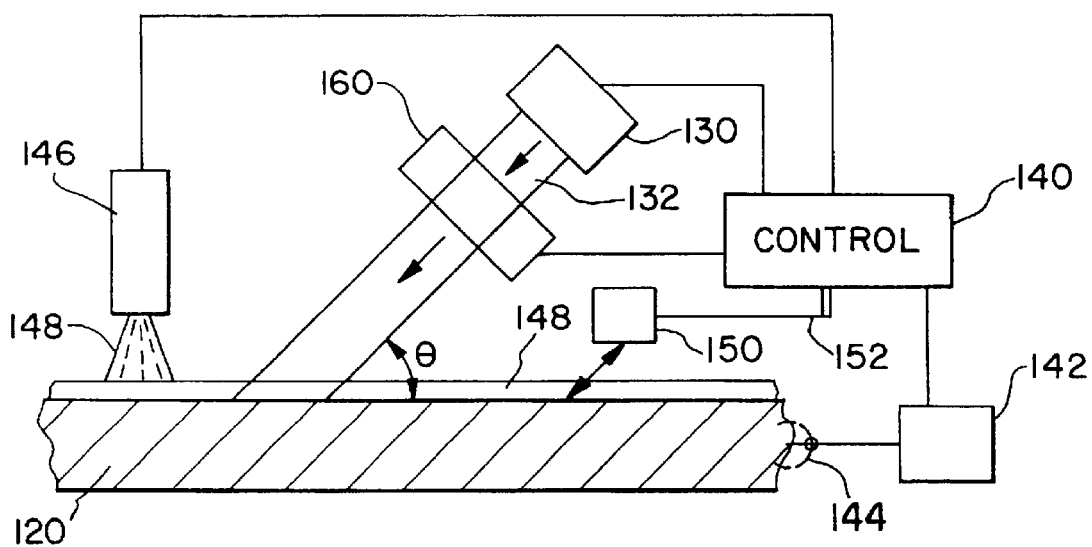
FIG. 8 is a diagrammatic view of one embodiment of the present invention showing possible modification of the polarization of the incident laser beam.

FIG. 8 shows an embodiment of an apparatus for improving properties of workpiece 120. The apparatus includes a laser 130 creating a laser beam 132. A control unit 140, implemented on a personal computer, is used to control operation of laser 130, along with control of positioning mechanism 142. Positioning mechanism 142 is connected to workpiece 120 via a connecting means, in this case, a gripper element 144. Such positioning mechanism 142 may position workpiece 120 relative to laser 130 by means of robotic arms or the like. Controller 140 is also connected to a transparent overlay applicator 146, that applies a layer of the transparent overlay material 148 over the surface of workpiece 120. Based upon the orientation of workpiece 120 to laser 130 and laser beam 132, there will be created a particular angle Θ therebetween.

A resolver or sensor unit 150 determines the particular angle of Θ, such as by energy reflection, radar, infrared sensing devices, or almost any known method to determine the relative orientation of the surface of workpiece 120. Such measured angle Θ is communicated via line 132 to controller 140. Based on the input received from sensor 150, i.e., the relative angle Θ between laser beam 132 and workpiece 120, controller 140 controls a means 160 for changing a characteristic of laser beam 132 as previously discussed. In one form of the invention, means 160 may include a particular different types of lenses and different shapes or sizes to adequately control effective orientation of the incident area of laser beam 132 on workpiece 120.

In another embodiment of the invention, the present inventors have determined that at particular angles Θ, additional effects are created, such that the transmitted and reflected characteristics of laser beam 132 will change. Such change may possibly reduce the amount of energy applied to workpiece 120, thereby reducing effectiveness and lowering of the residual compressive stresses created therein. If the transparent overlay characteristics are known, such effects of changing Θ, regarding the transmitted and reflected component of laser beam 132, will also be known and are available in various reference books. For instance, for particular thicknesses of water (a typical transparent overlay material) the smaller Θ becomes, the transmission and reflection characteristics are known. More precisely, more energy is reflected from the overlay surface, away from the workpiece than is transmitted through the overlay.

This embodiment of the invention utilizes a polarizing element that may be separate or included within the actual shape changing means to accurately change the orientation and polarization of laser beam 132 such that an increased amount of energy is applied through transparent overlay material 148. By controlling polarization of the laser beam 132, additional control of the energy applied to workpiece 120 is accomplished. Alternatively, it is also conceivable that a separate polarizing unit 160 may not be necessary in that controller 140 may control the polarization of the laser beam 132 with the source, i.e., within laser 130. Such results are equivalent in that polarization of the laser beam is thereby controlled as a basis of the incident angle Θ.

Figure 9:
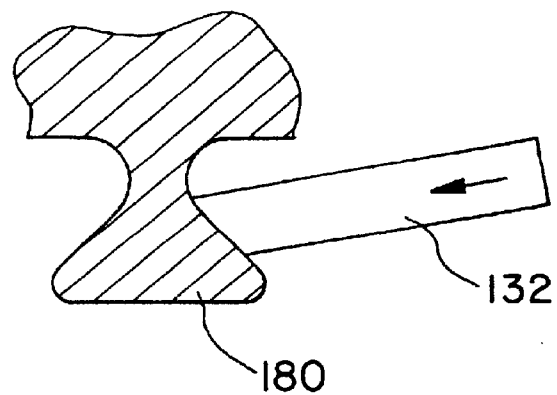
FIG. 9 shows a diagrammatic working of a dovetailed section on a workpiece.
Figure 10:
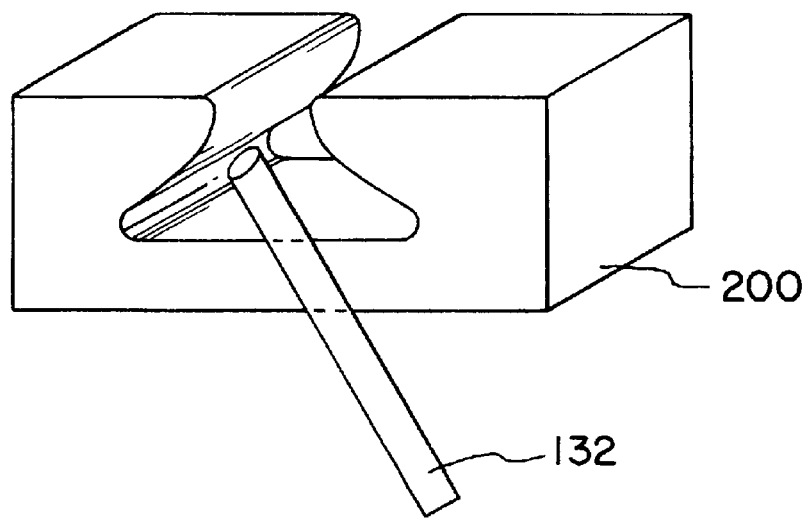
FIG. 10 shows a diagrammatic working of a dovetail slot in a workpiece.

FIG. 9 shows a laser beam 132 impacting a non-uniform surface, in this case, a dovetail section of a turbine blade 180. FIG. 10 shows a laser beam 132 impacting another non-uniform surface, in this case, a dovetail slot of a disk 200. Use of the term dovetailed section in this application refers to both a external section as shown in FIG. 9 and an internal section as shown in FIG. 10.

The present methods and apparatus are adapted for processing such non-uniform workpieces, and controlling the shape of the incident laser impacted area thereon.

It is now possible to process workpieces with laser shock processing in which the oblique angle of the laser pulse is greater than 45 degrees from the normal line to the workpiece, through the point of contact. Additionally, the oblique angle may be greater than 60 degrees from the normal to the workpiece through the point of contact if various criteria are met. In these cases, it is preferable to ensure that the polarization of the laser beam is controlled so that effective working and residual compressive forces are created in the workpiece.

The prior examples of laser beams utilized were all of a symmetric type beam having a uniform cross-section. However the These methods are not restricted to these shapes. To alter the incident or impact area on the workpiece in one dimension it is possible to use cylindrical lenses and other apparatus. The method of the present invention will also work for other types of laser beams geometries such as those of square, rectangular, or substantially any other shape and cross-section with a necessary changing of the incident shape, depending upon such laser beam cross-section shape. To change the beam shape in more than one dimension, appropriate lens configurations would be made.

A time constraint has also been found to be critical in utilization of the inventions discussed in this application. For nominally thin workpieces such as airfoils and blades, the time between laser pulses on opposite sides of the workpiece needs to be less than two (2) microseconds. Such maximum time between pulses is necessary to insure that the shockwaves created by the pulses overlap within the workpiece. If such created shockwaves do not meet within the workpiece, substantial distortion of the workpiece occurs.

Following the fact the inventors determined that relative incident angle is not limiting to successful laser processing but that the total energy applied to the workpiece area is what is important, further discovery was found regarding improved processing effects when the pressure pulses created by the system overlap or are congruent.

Figure 11:
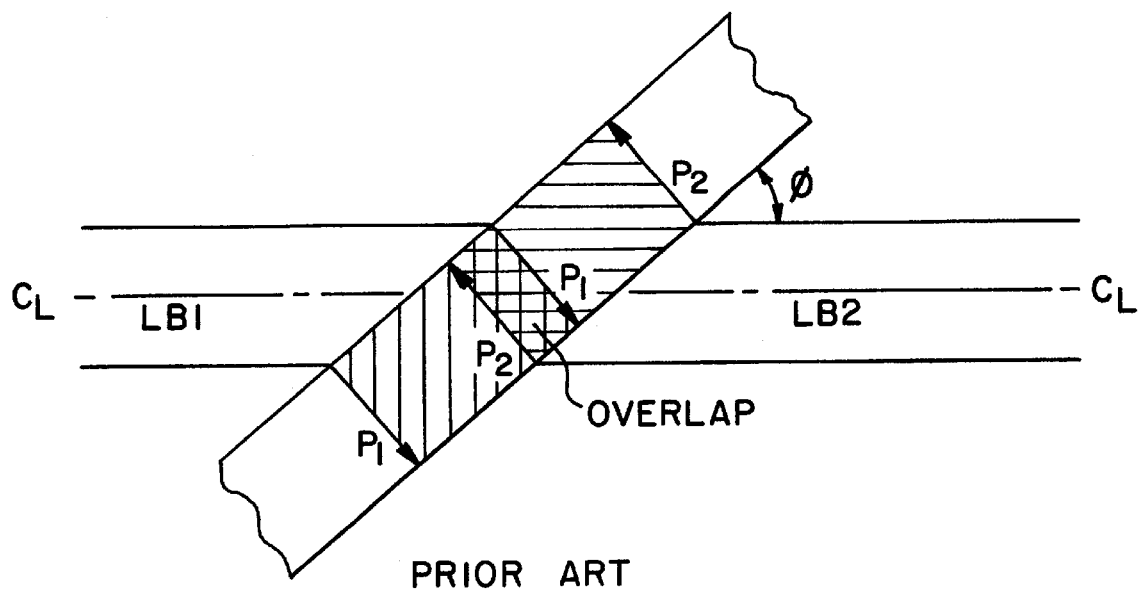
FIG. 11 is an diagrammatic view of prior art split beam processing on a thin workpiece showing how the applied laser beams are co-linear while the produced pressure pulses are noncongruent.

As shown in FIG. 11, the prior art use of split beam processing on thin workpieces at an angle created pressure pulsed areas that did not substantially overlap. Laser Beam 1 (LB1) and Laser Beam 2 (LB2) through conventional split beam processing are nearly collinear and laser application spots are aligned together relative to the laser beams on the workpiece. As can be seen by the created pressure pulses P1 and P2 (respectively created by LB1 and LB2), the pulses are not congruent and overlap in a generally small area. Pressure pulses created by laser peening are directed perpendicular to the workpiece surface regardless of the incident angle of the laser beam. Control of laser beam location and offset may be based on the desired combined compressive residual stress profile from the combined pressure pulses produced by the laser beam application to the workpiece. Alternate needs and requirements may further cause the laser beam offset and beam application point to vary.

Figure 12:
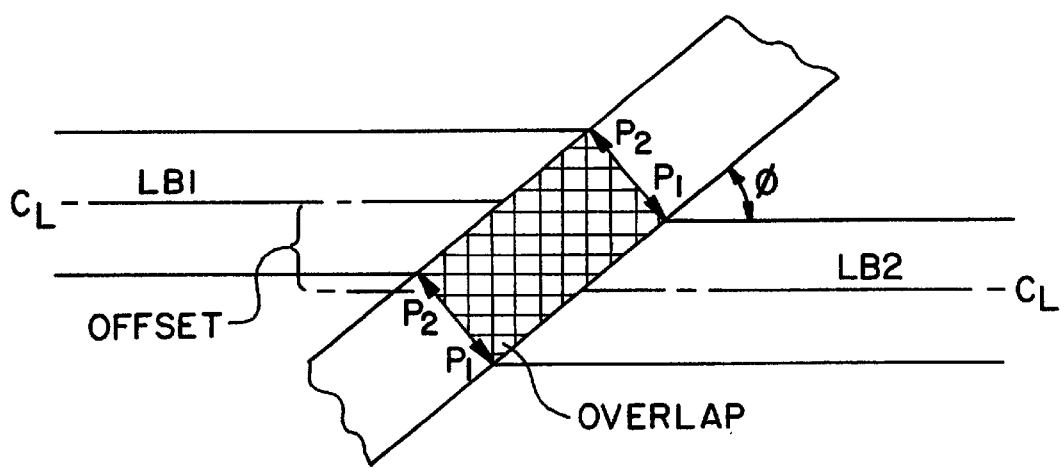
FIG. 12 is a diagrammatic view of one form of the invention in which split beam processing in now conducted with the laser beams offset to create congruence between the created pressure pulses.

The new improvement to split beam processing is to have the opposing pressure pulses substantially congruent, or substantially overlap each other as shown in FIG. 12. Such a condition enhances the residual compressive stresses within the workpiece.

A critical minimum of overlap or congruence have been determined at approximately 75% overlap of the pressure pulse volumes. At an overlap or congruence of 75% or less, operational problems appear involving the opaque or transparent overlay in the laser peening system. Further, overlaps of less then 75% of the pressure pulse volume within the workpiece is insufficient to stop warping effects on the workpiece.

FIG. 12 shows LB1 and LB2 offset in a manner in which the respective application spots on the workpiece are not aligned relative to the laser beams, but that the pressure pulses are congruent and substantially overlap each other on their passage through the workpiece.

Dependant upon the geometry of the workpiece, the offset of the laser beams and application spots may vary. Particularly for use on airfoils where the blade geometry is constantly changing, the offset between the application spots and laser beams may vary over the workpiece surface. For enhanced application of the laser peening process, both offset of the application spots and incident angles of the laser beams need to be considered.

Variables that may change the offset and need to be considered are the workpiece thickness and surface curvature to maintain the substantial pressure pulse congruence.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser processing method for processing a workpiece, the method comprising the steps of:
   applying a transparent overlay material to the workpiece; and
   directing a pulse of coherent energy to contact the solid material through the transparent overlay material to create a shock wave;
   positioning the workpiece in a particular orientation;
   controlling the shape of the contacting pulse based on the incident angle of the pulse to the workpiece.

2. A laser processing method for processing a workpiece having two sides, the method comprising the steps of:
   applying a laser beam to one side of the workpiece to create a first pressure pulse;
   applying a laser beam to the other side of the workpiece on a substantially opposite side thereof to create a second pressure pulse; and
   controlling said laser beams so that said first and second pressure pulses are substantially aligned through the workpiece and the workpiece experiences substantially identical conditions on said substantially opposite sides of the workpiece, said controlling step comprises offsetting said laser beams from one another based on the thickness and surface curvature of the workpiece.

3. The laser processing method of claim 2 in which said first pressure pulse and said second pressure pulse overlap by greater than 75 percent of the volume of a said pressure pulse.

4. A laser processing method for processing a workpiece having two sides, the method comprising the steps of:
   applying a laser beam to one side of the workpiece to create a first pressure pulse;
   applying a laser beam to the other side of the workpiece on a substantially opposite side thereof to create a second pressure pulse; and
   controlling said laser beams so that said first and second pressure pulses are substantially aligned through the workpiece and the workpiece experiences substantially identical conditions on said substantially opposite sides of the workpiece, said controlling step comprises offsetting said laser beams from one another.

5. The laser processing method of claim 4 in which said first pressure pulse and said second pressure pulse overlap by greater than 75 percent of the volume of a said pressure pulse.

6. A laser processing method for processing a workpiece having two sides, the method comprising the steps of:
   applying a laser beam to one side of the workpiece to create a first pressure pulse;
   applying a laser beam to the other side of the workpiece on a substantially opposite side thereof to create a second pressure pulse; and
   controlling said laser beams so that said first and second pressure pulses are substantially aligned through the workpiece and the workpiece experiences substantially identical conditions on said substantially opposite sides of the workpiece, said controlling step comprises offsetting said laser beams from one another based on the desired combined compressive residual stress profile from said pressure pulses applied to the workpiece.

* * * * *